US012631511B2

(12) United States Patent
Kobayashi et al.

(10) Patent No.: US 12,631,511 B2
(45) Date of Patent: May 19, 2026

(54) SENSOR MEMBER AND PHYSICAL QUANTITY SENSOR

(71) Applicant: TDK CORPORATION, Tokyo (JP)

(72) Inventors: Masanori Kobayashi, Tokyo (JP); Ken Unno, Tokyo (JP); Tetsuya Sasahara, Tokyo (JP); Tetsuo Hata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 299 days.

(21) Appl. No.: 18/454,170

(22) Filed: Aug. 23, 2023

(65) Prior Publication Data

US 2024/0068897 A1 Feb. 29, 2024

(30) Foreign Application Priority Data

Aug. 31, 2022 (JP) ................................. 2022-138403

(51) Int. Cl.
*G01L 19/06* (2006.01)
*G01L 9/04* (2006.01)
*G01L 19/00* (2006.01)

(52) U.S. Cl.
CPC ............ *G01L 19/0627* (2013.01); *G01L 9/04* (2013.01); *G01L 19/0069* (2013.01)

(58) Field of Classification Search
CPC . G01L 19/147; G01L 9/0072; G01L 19/0645; G01L 19/0084; G01L 13/025; G01L 19/0007; G01L 9/0042; G01L 19/0038; G01L 9/0073; G01L 9/0075; G01L 9/0054; G01L 9/0055; G01L 19/04;
(Continued)

(56) References Cited

U.S. PATENT DOCUMENTS 10,921,205 B2 * 2/2021 Kanazawa ............ G01L 9/0054
2005/0193836 A1 9/2005 Yoshida et al.
(Continued)

FOREIGN PATENT DOCUMENTS

| JP | 2005-249520 A | 9/2005 | |
| JP | 2022-014344 A | 1/2022 | |
| WO | WO-2018131170 A1 * | 7/2018 | ............. H10D 48/50 |
| WO | WO-2022209963 A1 * | 10/2022 | ............... G01B 7/18 |
| WO | WO-2023276884 A1 * | 1/2023 | ............... G01L 9/04 |

OTHER PUBLICATIONS

Jul. 25, 2025 Office Action issued in U.S. Appl. No. 18/454,194.
(Continued)

*Primary Examiner* — Andre J Allen
(74) *Attorney, Agent, or Firm* — Oliff PLC

(57) ABSTRACT

A sensor member capable of suitably preventing a problem such as the intrusion of moisture or the like through an interface between an electrode and a protective film, including: a protected portion provided on one surface of a metal base and including a detection portion; a protective film including a first protective film portion having a first thickness and a second protective film portion having a second thickness thicker than the first thickness and formed at an opening peripheral edge of an opening leading to the protected portion, and covering at least a part of the protected portion from above; and an electrode portion including a first electrode portion disposed in the opening and connected to the protected portion, and a second electrode portion connected to the first electrode portion at an outer peripheral edge of the first electrode portion and formed on the second protective film portion.

8 Claims, 4 Drawing Sheets

(58) Field of Classification Search

CPC . G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 19/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 19/0061; G01L 9/0005; G01L 9/0041; G01L 9/0019; G01L 9/08; G01L 9/10; G01L 21/00; G01L 9/04; G01L 11/006; G01L 19/086; G01L 9/00; G01L 9/0008; G01L 1/18; G01L 11/004; G01L 19/069; G01L 9/0057; G01L 19/083; G01L 19/06; G01L 19/10; G01L 19/16; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/2268; G01L 11/06; G01L 21/30; G01L 21/34; G01L 23/221; G01L 7/187; G01L 7/20; G01L 1/146; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 5/24; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC .................................................. 73/700–756

See application file for complete search history.

(56) References Cited

U.S. PATENT DOCUMENTS

| | | | |
|---|---|---|---|
| 2011/0226069 A1* | 9/2011 | Kim ...................... | G01L 1/2293 |
| | | | 29/25.01 |
| 2015/0001650 A1 | 1/2015 | Matsunami et al. | |
| 2017/0082512 A1* | 3/2017 | Saitoh ................... | G01L 9/0051 |
| 2020/0386641 A1* | 12/2020 | Pfeiffer ................. | G01L 9/0054 |
| 2023/0273083 A1* | 8/2023 | Kobayashi ............ | G01L 9/0044 |
| | | | 73/715 |
| 2024/0170189 A1* | 5/2024 | Nawaoka ................. | G01L 9/04 |

OTHER PUBLICATIONS

Jan. 4, 2024 Extended Search Report issued in European Patent Application No. 23193235.1.

(56)                     References Cited

OTHER PUBLICATIONS

Dec. 21, 2023 Extended Search Report issued in European Patent
Application No. 23193398.7.
U.S. Appl. No. 18/454,194, filed Aug. 23, 2023 in the name of
Masanori Kobayashi.
Jan. 29, 2026 Notice of Allowance issued in U.S. Appl. No.
18/454,194.

\* cited by examiner

SENSOR MEMBER AND PHYSICAL QUANTITY SENSOR

BACKGROUND OF THE INVENTION

Field of the Invention

The present invention relates to a physical quantity sensor and a sensor member constituting the physical quantity sensor.

Description of the Related Art

As sensor members constituting physical quantity sensors such as a pressure sensor, there is known a sensor member that is formed on a metal base through a film formation step and the like. Among such sensor members, there are sensor members requiring high reliability even in a harsh environment such as a high temperature and high humidity environment.

A technique for providing a protective film that protects a detection portion has been proposed as a technique for improving the reliability of a sensor member (refer to JP 2005-249520 A). However, since an electrode for ensuring electrical connection with the detection portion cannot completely cover the protective film and the like, moisture or the like may intrude through an interface between the electrode and the protective film, which becomes a challenge in improving reliability.

CITATION LIST

Patent Document 1: JP 2005-249520 A

SUMMARY OF THE INVENTION

The present invention has been conceived in view of such circumstances, and an object of the present invention is to provide a sensor member capable of suitably preventing a problem such as the intrusion of moisture or the like through an interface between an electrode and a protective film.

According to the present invention, there is provided a sensor member including: a protected portion provided on one surface of a metal base and including a detection portion; a protective film including a first protective film portion having a first thickness and a second protective film portion having a second thickness thicker than the first thickness and formed at an opening peripheral edge of an opening leading to the protected portion, and covering at least a part of the protected portion from above; and an electrode portion including a first electrode portion disposed in the opening and connected to the protected portion, and a second electrode portion connected to the first electrode portion at an outer peripheral edge of the first electrode portion and formed on the second protective film portion.

In the sensor member according to the present invention, as can be understood from a relationship between the second protective film portion and the second electrode portion, since the electrode portion is formed on the protective film, an area of the opening formed in the protective film can be made narrower than an exposed area of the electrode portion when viewed from above. In addition, the protective film includes the second protective film portion with a thick thickness around the opening for connecting the electrode portion to the protected portion. In the sensor member having such a structure, since the distance that an interface between the protective film and the electrode portion shields the protected portion is long, the interface being formed at a periphery of the opening, a problem such as the intrusion of moisture or the like through the interface can be suitably prevented.

In addition, for example, an outer electrode surface of the electrode portion which does not face the protective film and an outer protective film surface of the protective film which does not face the electrode portion may be connected at an outer peripheral edge of an interface between the electrode portion and the protective film without forming a step.

Since the outer electrode surface and the outer protective film surface are connected at the outer peripheral edge of the interface without forming a step, the problem that moisture accumulated on the step intrudes into the interface can be suitably prevented, and the reliability can be enhanced.

In addition, for example, when viewed from above, an outer peripheral edge of the second electrode portion which is also an outer peripheral edge of the electrode portion may coincide with an outer peripheral edge of the second protective film portion.

In such a sensor member, since the thickness of the protective film is thin at a position where the protective film coincides with the outer peripheral edge of the electrode portion, the problem that a depression or the like where moisture or the like is likely to accumulate is formed at the outer peripheral edge of the interface can be prevented.

In addition, for example, the protective film may be transitionally changed in thickness from the first thickness at a connection position with the first protective film portion to the second thickness at a connection position with the second protective film portion, and may include a third protective film portion connecting the first protective film portion and the second protective film portion.

In such a sensor member, since the thickness of the protective film changes gently, the occurrence of cracks due to the concentration of stress in the protective film can be more suitably prevented, and the reliability can be enhanced.

In addition, for example, the electrode portion may comprises at least one of Au, Ag, Cu, and Pd.

The adhesiveness of the electrode portion to the protective film that is relatively soft can be enhanced. In addition, since such an electrode portion is chemically stable, the electrode portion contributes to improving the reliability of the sensor member.

In addition, the protective film may comprises at least one of an oxide, a nitride, and an oxynitride.

Since such a protective film has high strength, the structural strength particularly at the periphery of the opening can be improved, and the reliability of the sensor member can be improved.

In addition, for example, an adhesive layer may be formed at an interface between the electrode portion and the protective film.

Since the adhesion strength between the protective film and the electrode portion is improved by such an adhesive layer, a problem such as the intrusion of moisture or the like through the interface can be more suitably prevented.

In addition, for example, the protected portion may include an insulating film covering the one surface from above, and a strain-resistance film formed on the insulating film and constituting the detection portion.

The strain-resistance film constitutes the detection portion while the insulating film ensures insulation from the metal base, and such a sensor member can detect a physical quantity associated with a deformation of the metal base, even in a harsh environment such as a high temperature and high humidity environment.

In addition, for example, the detection portion may detect a pressure acting on the metal base.

Such a sensor member realizes a pressure sensor with high reliability capable of performing stable detection even when installed in a harsh environment such as a high temperature and high humidity environment for a long period of time.

DETAILED DESCRIPTION OF THE INVENTION

Figure 1:
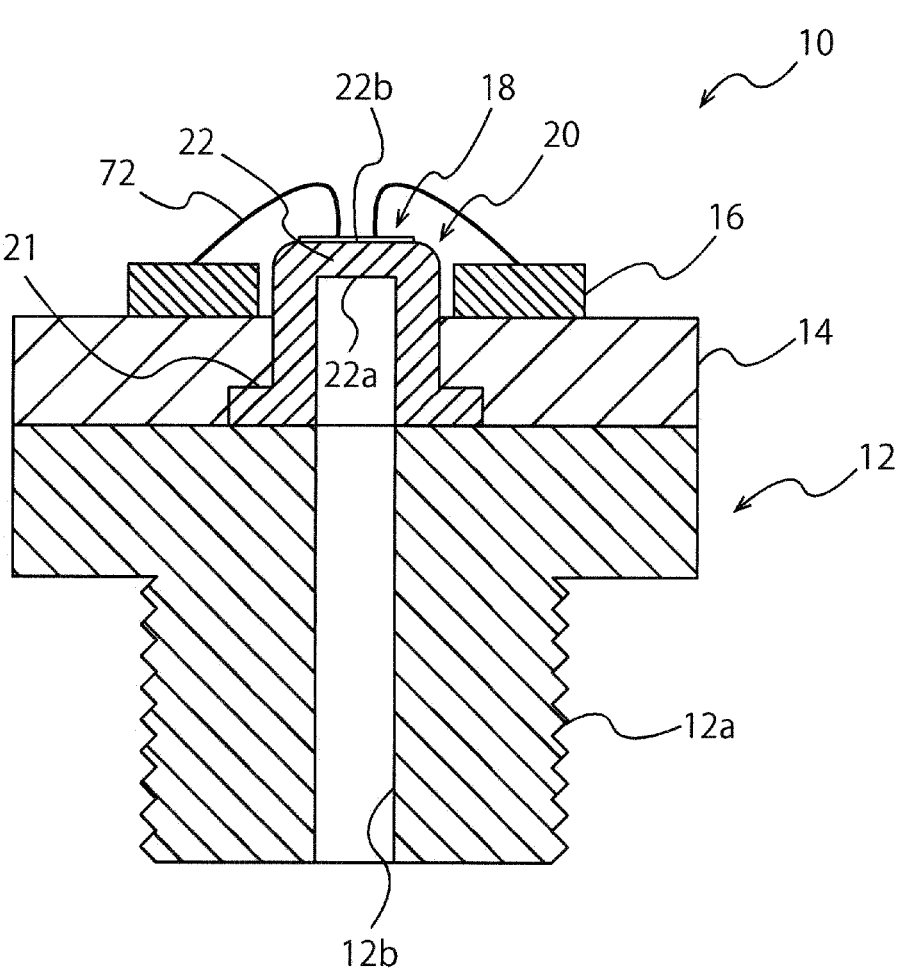
FIG. 1 is a schematic cross-sectional view of a pressure sensor including a sensor member according to one embodiment of the present invention.

Hereinafter, the present invention will be described based on an embodiment illustrated in the drawing.

FIG. 1 is a schematic cross-sectional view of a pressure sensor 10 using a sensor member 18 according to one embodiment of the present invention. As illustrated in FIG. 1, the pressure sensor 10 includes a stem 20 having a hollow cylindrical shape. The stem 20 is made of, for example, metal such as steel, aluminum alloy, stainless steel, or nickel alloy. The stem 20 includes a membrane 22 constituting an end wall disposed at one end of the hollow cylinder, and the membrane 22 undergoes deformation corresponding to pressure. As will be described later, the membrane 22 constitutes a metal base on which a detection portion 33 and the like of the sensor member 18 are provided. As the metal base of the sensor member 18, the metals described above as the material of the stem 20 can be used, and particularly, austenitic stainless steels such as SUS304 and SUS316, precipitation hardening stainless steels such as SUS630 and SUS631, and the like are preferably used from the viewpoint of durability at high temperatures or the like.

As illustrated in FIG. 1, the other end of the stem 20 is an open end of a hollow portion, and the hollow portion of the stem 20 communicates with a flow path 12b of a connection member 12. In the pressure sensor 10, a fluid introduced into the flow path 12b is guided from the hollow portion of the stem 20 to an inner surface 22a that is the other surface of the membrane 22, and the fluid pressure acts on the membrane 22.

A flange portion 21 is formed around the open end of the stem 20 to protrude outward from an axis of the stem 20. The flange portion 21 is sandwiched between the connection member 12 and a pressing member 14, so that the flow path 12b leading to the inner surface 22a of the membrane 22 is sealed.

The connection member 12 includes a thread groove 12a for fixing the pressure sensor 10. The pressure sensor 10 is fixed to a pressure chamber or the like in which the fluid as a measurement object is enclosed, through the thread groove 12a. Accordingly, the flow path 12b formed inside the connection member 12 and the inner surface 22a of the membrane 22 of the stem 20 airtightly communicate with the pressure chamber in which the fluid as a measurement object exists.

A circuit substrate 16 is attached to an upper surface of the pressing member 14. The circuit substrate 16 has a ring shape surrounding a periphery of the stem 20; however, the shape of the circuit substrate 16 is not limited to this shape. For example, a circuit and the like to which a detection signal from the sensor member 18 is transmitted are built-in in the circuit substrate 16.

Figure 2:
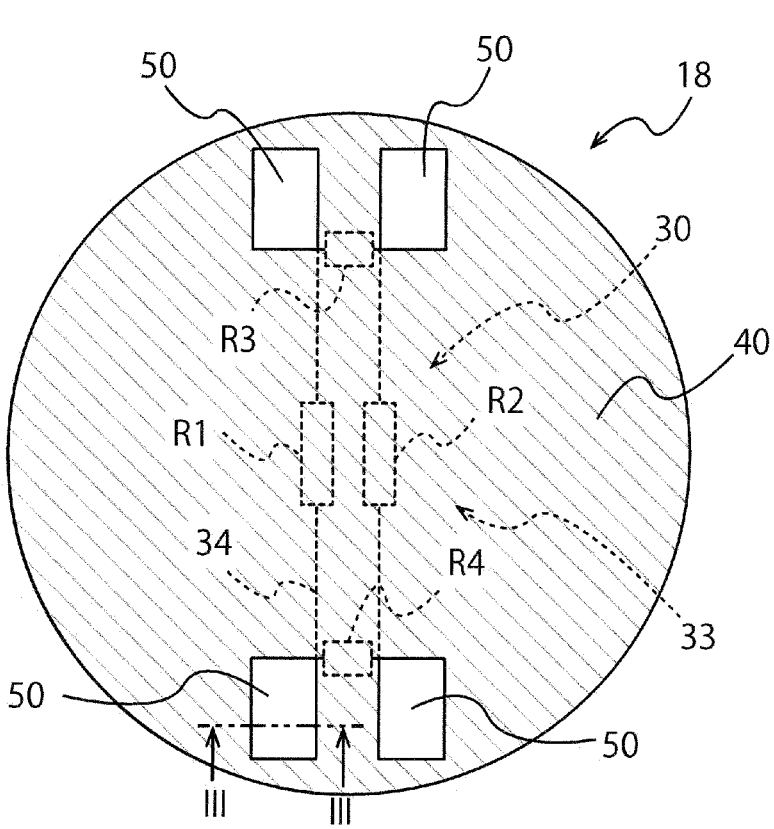
FIG. 2 is a plan view of the sensor member included in the pressure sensor illustrated in FIG. 1, when viewed from above.

As illustrated in FIG. 1, the sensor member 18 is formed on an end surface of the stem 20. FIG. 2 is a plan view of an end surface portion of the stem 20 illustrated in FIG. 1, when viewed from above. As illustrated in FIG. 2, the sensor member 18 includes a protective film 40 and electrode portions 50 exposed from the protective film 40. In addition, the sensor member 18 includes a protected portion 30 protected from an external environment by the protective film 40. The protected portion 30 is disposed below the protective film 40 and the electrode portions 50. As will be described later, the protected portion 30 includes the detection portion 33 that detects a pressure.

As illustrated in FIG. 1, the electrode portions 50 and the circuit substrate 16 are connected by intermediate wirings 72 through wire bonding or the like. Incidentally, the illustration of the intermediate wirings 72 is omitted in FIG. 2.

Figure 3:
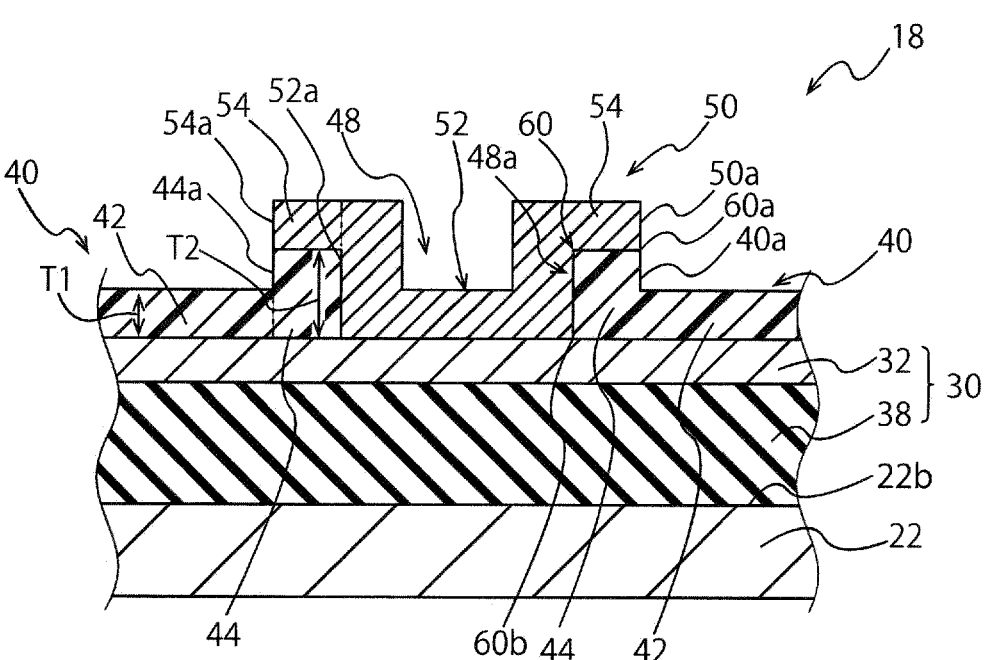
FIG. 3 is a partial cross-sectional view of the sensor member illustrated in FIG. 1.

FIG. 3 is a cross-sectional view of the sensor member 18 taken along sectional line III-III illustrated in FIG. 2. Hereinafter, the sensor member 18 will be described mainly with reference to FIGS. 2 and 3.

As illustrated in FIG. 3, in the sensor member 18, the protected portion 30 including the detection portion 33 (refer to FIG. 2) is provided on an outer surface 22b that is one surface of the membrane 22 as the metal base. The protected portion 30 is disposed between the membrane 22 and the protective film 40, is shielded from the fluid and the like therebelow by the membrane 22, and is protected from an external environment, in which the sensor member 18 is provided, by the protective film 40 thereabove.

As illustrated in FIG. 3, the protected portion 30 includes an insulating film 38 and a strain-resistance film 32. The insulating film 38 covers the outer surface 22b of the membrane 22 as the metal base from above. In addition, the insulating film 38 is located between the membrane 22 therebelow and the strain-resistance film 32 thereabove to ensure electrical insulation between the membrane 22 and the strain-resistance film 32.

Although not illustrated in FIG. 2, the insulating film 38 is formed to cover substantially the entirety of the outer surface 22b of the membrane 22. The insulating film 38 is composed of, for example, an insulating film made of silicon oxide, silicon nitride, silicon oxynitride, or the like. A thickness of the insulating film 38 is preferably 10 μm or less, further preferably 1 to 5 μm. The insulating film 38 can be formed on the outer surface 22b of the membrane 22, for example, by a vapor deposition method such as CVD.

As illustrated in FIG. 3, the strain-resistance film 32 is formed on the insulating film 38, and constitutes the detection portion 33 illustrated in FIG. 2. As illustrated in FIG. 2, in the strain-resistance film 32, a first resistor R1, a second resistor R2, a third resistor R3, and a fourth resistor R4 are formed in a predetermined pattern. The first to fourth resistors R1, R2, R3, and R4 generate strain corresponding to the deformation of the membrane 22, and are changed in resistance according to the deformation of the membrane 22. The first to fourth resistors R1 to R4 are connected by electrical wirings 34 formed on the same strain-resistance film 32, so as to constitute a Wheatstone bridge circuit as the detection portion 33.

In addition, since the deformation amount of the membrane 22 detected by the detection portion 33 changes depending on the pressure of the fluid acting on the membrane 22, the detection portion 33 can detect a fluid pressure that is the pressure of the fluid acting on the membrane 22 that is a metal member. Namely, the first to fourth resistors R1, R2, R3, and R4 of the sensor member 18 illustrated in FIG. 2 are provided at positions where the membrane 22 illustrated in FIGS. 1 and 2 is deformed and strained by the fluid pressure, and are configured such that the resistances change according to the strain amounts thereof. Incidentally, the pressure sensor 10 illustrated in FIG. 1 can receive an output of the detection portion 33 of the sensor member 18 or supply electric power from a power supply unit to the sensor member 18, via the circuit substrate 16.

The strain-resistance film 32 including the first to fourth resistors R1, R2, R3, and R4 illustrated in FIG. 2 can be produced, for example, by patterning a conductive thin film made of a predetermined material. The strain-resistance film 32 contains, for example, Cr and Al, preferably contains 50 to 99 at % of Cr and 1 to 50 at % of Al, and further preferably contains 70 to 90 at % of Cr and 5 to 30 at % of Al. Since the strain-resistance film 32 contains Cr and Al, the temperature coefficient of resistance (TCR) or temperature coefficient of sensitivity (TCS) under a high temperature environment is stable and highly accurate pressure detection can be performed. In addition, both a high gauge factor and good temperature stability can be achieved at a higher level by setting the amounts of Cr and Al within predetermined ranges.

The strain-resistance film 32 may contain an element other than Cr and Al, and for example, the strain-resistance film 32 may contain O or N. O or N contained in the strain-resistance film 32, which is not completely removed and remains in a reaction chamber when the strain-resistance film 32 is formed, may be incorporated into the strain-resistance film 32. In addition, O or N contained in the strain-resistance film 32 may be intentionally introduced into the strain-resistance film 32 by being used as an atmospheric gas during film formation or during annealing.

In addition, the strain-resistance film 32 may contain a metal element other than Cr and Al. The strain-resistance film 32 may contain a small amount of a metal or non-metal element other than Cr and Al, and heat treatment such as annealing may be performed, so that the gauge factor or temperature property is improved. Examples of the metal and non-metal elements other than Cr and Al contained in the strain-resistance film 32 include Ti, Nb, Ta, Ni, Zr, Hf, Si, Ge, C, P, Se, Te, Zn, Cu, Bi, Fe, Mo, W, As, Sn, Sb, Pb, B, Ge, In, Tl, Ru, Rh, Re, Os, Ir, Pt, Pd, Ag, Au, Co, Be, Mg, Ca, Sr, Ba, Mn, and rare earth elements.

The strain-resistance film 32 can be formed by a thin film method such as sputtering or vapor deposition. The first to fourth resistors R1, R2, R3, and R4 can be formed, for example, by patterning a thin film into a meandering shape. The thickness of the strain-resistance film 32 is not particularly limited, and is preferably 10 μm or less, further preferably 0.1 to 1 μm. Incidentally, as illustrated in FIG. 3, the electrical wirings 34 are formed by patterning the strain-resistance film 32. However, the electrical wirings 34 can also be formed from a conductive film or layer different from the strain-resistance film 32.

As illustrated in FIG. 3, the protective film 40 is formed on the protected portion 30, and covers at least a part of the protected portion 30 from above. As illustrated in FIGS. 2 and 3, openings 48 in which the electrode portions 50 are formed are formed in the protective film 40. As illustrated in FIG. 2, the protective film 40 is formed to cover the entirety of an upper surface of the strain-resistance film 32 of the protected portion 30 except for portions at which the openings 48 are formed. Incidentally, in FIG. 2, for the purpose of the description of the disposition of the protective film 40, the protective film 40 is hatched with oblique lines, and the shapes of the detection portion 33 and the like formed in the protected portion 30 below the protective film 40 are illustrated through the protective film 40 by dotted lines.

As illustrated in FIG. 3, the protective film 40 includes a first protective film portion 42 having a first thickness T1, and second protective film portions 44 having a second thickness T2 thicker than the first thickness T1. The second protective film portions 44 are formed at opening peripheral edges 48a of the openings 48 leading to the protected portion 30. The first protective film portion 42 is formed at a portion other than the opening peripheral edges 48a of the openings 48 at which the second protective film portions 44 are formed. Namely, in the protective film 40, the thickness (second thickness T2) of portions around the openings 48 is thicker than the thickness (first thickness T1) of the other portion away from the openings 48.

The second protective film portions 44 are formed, for example, in regions within approximately 10 μm from outer edges of the openings 48. The first protective film portion 42 is formed, for example, in a region that is away from the outer edges of the openings 48 by approximately 10 μm or more. Incidentally, the first thickness T1 and the second thickness T2 are average thicknesses of the first protective film portion 42 and the second protective film portions 44, and the film thicknesses of the first protective film portion 42 and the second protective film portions 44 do not necessarily need to be constant.

The first thickness T1 of the first protective film portion 42 of the protective film 40 can be set to, for example, approximately 10 to 1000 nm, preferably approximately 100 to 300 nm. The second thickness T2 of the second protective film portions 44 of the protective film 40 can be set to, for example, approximately 101 to 300%, preferably approximately 106 to 150% of the first thickness T1. The distance that an interface 60 between the protective film 40 and the electrode portions 50 shields the protected portion 30 can be lengthened by setting the second thickness T2 to be thicker than the first thickness T1; however, when the second thickness T2 is too thick, it takes too much time to form the protective film 40, which is a problem.

The protective film 40 is composed of, for example, an insulating film similarly to the insulating film 38. Examples of the insulating film constituting the protective film 40 include films made of an oxide, a nitride, and an oxynitride, and these films are preferably used from the viewpoint of improving the strength of the protective film 40. More specifically, examples of the material constituting the protective film 40 include $SiO_2$, $SiON$, $Si_3N_4$, $AlO_3$, and $ZrO_2$.

The protective film 40 can be formed on the strain-resistance film 32 that is a part of the protected portion 30, for example, by a vapor deposition method such as CVD, sputtering, or the like; however, the method for forming the protective film 40 is not particularly limited.

As illustrated in FIGS. 2 and 3, the electrode portion 50 is formed inside the opening 48 of the protective film 40 and at the opening peripheral edge 48a of the opening 48. As illustrated in FIG. 2, in the sensor member 18, the electrode portions 50 are formed at four locations to correspond to the openings 48 of the protective film 40. However, the number and disposition of the electrode portions 50 included in the sensor member 18 are not limited only to the example illustrated in FIG. 2.

As illustrated in FIG. 3, the electrode portion 50 includes a first electrode portion 52 disposed in the opening 48 and connected to the strain-resistance film 32 of the protected portion 30, and a second electrode portion 54 connected to the first electrode portion 52 at an outer peripheral edge 52*a* of the first electrode portion 52 and formed on the second protective film portion 44.

The first electrode portion 52 is a portion of the electrode portion 50 which is disposed inside the opening peripheral edge 48*a* of the protective film 40 when the sensor member 18 is viewed from above. A lower portion of the first electrode portion 52 is disposed in the inside of the opening 48 which is a region inside the opening peripheral edge 48*a* and lower than an upper end of the second protective film portion 44, and a lower end of the first electrode portion 52 is in contact with the strain-resistance film 32. In addition, an upper portion of the first electrode portion 52 is disposed in a region higher than the upper end of the second protective film portion 44, and is connected to the second electrode portion 54.

The second electrode portion 54 is a portion of the electrode portion 50 which is disposed outside the outer edge of the opening 48 when the sensor member 18 is viewed from above. As illustrated in FIG. 3, the second electrode portion 54 is provided on the second protective film portion 44, and is connected to the first electrode portion 52 on an inner side, the first electrode portion 52 being disposed in the opening 48.

As illustrated in FIG. 3, the interface 60 between the electrode portion 50 and the protective film 40 (second protective film portion 44) is formed between the outer peripheral edge 52*a* of the first electrode portion 52 and an inner wall of the opening 48 and between a lower end surface of the second electrode portion 54 and an upper end surface of the second protective film portion 44. Therefore, the interface 60 between the electrode portion 50 and the protective film 40 is continuous from an inner edge 60*b* facing the protected portion 30 to an outer peripheral edge 60*a* of an upper surface of the sensor member 18.

As illustrated in FIG. 3, an outer electrode surface 50*a* of the electrode portion 50 which does not face the protective film 40 and an outer protective film surface 40*a* of the protective film 40 which does not face the electrode portion 50 are connected at the outer peripheral edge 60*a* of the interface 60 without forming a step. Since a step is not formed at the outer peripheral edge 60*a* of the interface 60, and the outer electrode surface 50*a* and the outer protective film surface 40*a* are smoothly connected, in the sensor member 18, moisture or the like can be prevented from accumulating at the outer peripheral edge 60*a* of the interface 60, and moisture or the like can be more suitably prevented from intruding from the interface 60 into the protected portion 30.

As illustrated in FIG. 3, in the sensor member 18, when viewed from above, an outer peripheral edge 54*a* of the second electrode portion 54 which is also an outer peripheral edge of the electrode portion 50 coincides with an outer peripheral edge 44*a* of the second protective film portion 44. In the sensor member 18, since the thickness of the protective film 40 is thin at a position where the protective film 40 coincides with the outer peripheral edge of the electrode portion 50, the problem that a depression or the like where moisture or the like is likely to accumulate is formed at the outer peripheral edge 60*a* of the interface 60 can be prevented.

The electrode portion 50 is composed of a conductive film or the like made of metal or the like; however, the electrode portion 50 may contain any one of Au, Ag, Cu, and Pd. The adhesiveness of the electrode portion 50 to the protective film 40 that is relatively soft can be enhanced. In addition, since the electrode portion 50 is chemically stable, the electrode portion 50 contributes to improving the reliability of the sensor member 18.

A thickness of the electrode portion 50 can be set to, for example, 50 to 500 nm, and is preferably set to 100 to 300 nm. The electrode portion 50 can be formed, for example, by a thin film method such as sputtering or a vapor deposition method.

The sensor member 18 illustrated in FIG. 3 and the like can be manufactured, for example, by the following manufacturing method. First, the insulating film 38 with a predetermined thickness is formed on the outer surface 22*b* of the membrane 22 as the metal base. Next, the strain-resistance film 32 is formed on an upper surface of the insulating film 38. The strain-resistance film 32 is formed, for example, by a thin film method such as vapor deposition or sputtering. The shape of the strain-resistance film 32 including the first to fourth resistors R1, R2, R3, and R4, the electrical wirings 34, and the like illustrated in FIG. 2 is formed by performing patterning through photolithography or the like.

Next, the protective film 40 is formed to cover the strain-resistance film 32 from above. The openings 48 that expose parts of the strain-resistance film 32 as illustrated in FIG. 3 is formed in the protective film 40. The protective film 40 is also formed by a thin film method such as CVD, vapor deposition, or sputtering. In addition, the protective film 40 including the openings 48 can be formed by lift-off, etching, or the like.

Further, the electrode portions 50 are formed by forming a metal film on the strain-resistance film 32 and the protective film 40 using a thin film method, and then by shaping an outer peripheral edge of the metal film. Incidentally, before the formation of the electrode portions 50 or in conjunction with the formation of the electrode portions 50, the shape of the protective film 40 as illustrated in FIG. 3 including the second protective film portions 44 having a thick thickness at the opening peripheral edges 48*a* is formed. The sensor member 18 is obtained through such steps. The shapes of the first protective film portion 42, the second protective film portions 44, and the electrode portions 50 as illustrated in FIGS. 2 and 3 can be formed, for example, by lift-off, etching, or the like.

As described with reference to FIGS. 1 to 3, in the sensor member 18, since the electrode portion 50 is formed on the protective film 40, an area of the opening 48 formed in the protective film 40 can be made narrower than an exposed area of the electrode portion 50 when viewed from above. In addition, the protective film 40 includes the second protective film portion 44 with a thick thickness around the opening 48 for connecting the electrode portion 50 to the protected portion 30. In the sensor member 18 having such a structure, since the distance that the interface 60 between the protective film 40 and the electrode portion 50 shields the protected portion 30 is long, the interface 60 being formed at a periphery of the opening 48, a problem such as the intrusion of moisture or the like through the interface 60 can be suitably prevented.

Incidentally, the sensor member 18 described with reference to FIGS. 1 to 3 is merely one embodiment of the present invention, and it goes without saying that the technical scope of the present invention includes many other embodiments or modification examples. For example, the detection portion 33 of the sensor member 18 detects a pressure acting on the membrane 22 as the metal base; however, the detection portion 33 is not limited only to detecting a pressure, and may detect physical quantities other than the pressure, such as strain, acceleration, torque, and inclination. Physical quantity sensors other than the pressure sensor can be configured by using such a sensor member.

In addition, an adhesive layer may be formed at the interface 60 between the electrode portion 50 and the protective film 40. Examples of the adhesive layer includes films containing Cr, Ti, Ni, Mo, and the like, and the film thickness can be set to, for example, approximately 1 to 50 nm, preferably approximately 5 to 20 nm. By providing the adhesive layer, the adhesiveness between the electrode portion 50 and the protective film 40 at the interface 60 can be improved, and the intrusion of moisture or the like from the interface 60 can be more suitably prevented. In addition, since Cr, Ti, Ni, Mo, and the like easily form alloys with other metals, the adhesion strength between the films can be suitably enhanced.

Figure 4:
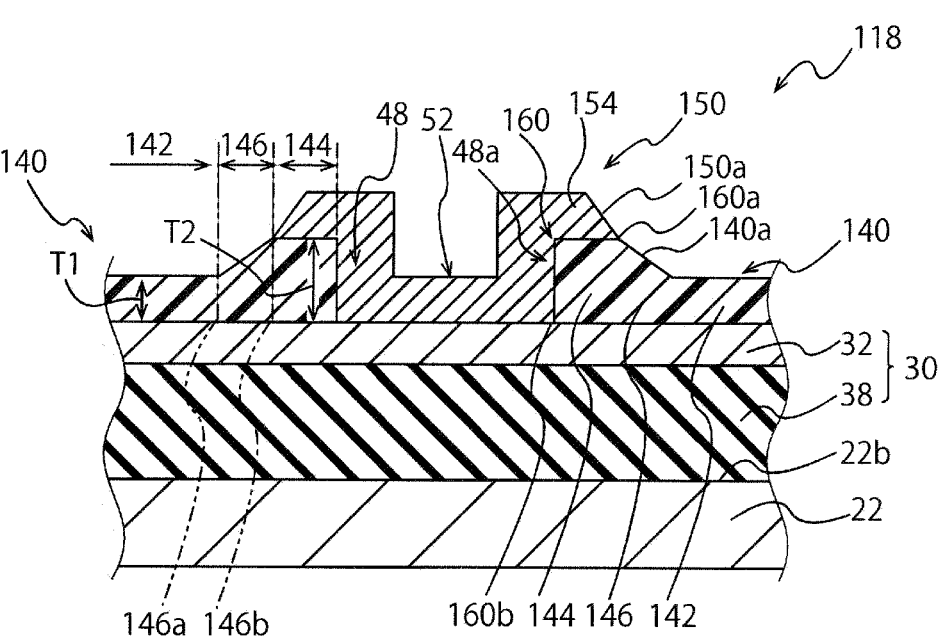
FIG. 4 is a partial cross-sectional view of a sensor member according to a modification example.

FIG. 4 is a cross-sectional view of a periphery of an electrode portion 150 of a sensor member 118 according to a modification example. The sensor member 118 differs from the sensor member 18 illustrated in FIG. 3 in that a protective film 140 includes a third protective film portion 146 and an outer electrode surface 150a of the electrode portion 150 is inclined, but is the same as the sensor member 18 in the other aspects. Regarding the sensor member 118, the points of difference from the sensor member 18 will be mainly described, and the description of the points in common with the sensor member 18 will be omitted.

The sensor member 118 includes the membrane 22 and the protected portion 30 including the detection portion 33 that are the same as those of the sensor member 18 illustrated in FIGS. 1 to 3. In addition, similarly to the protective film 40 illustrated in FIG. 3, the protective film 140 of the sensor member 118 includes a first protective film portion 142 having the first thickness T1 and a second protective film portion 144 having the second thickness T2 and formed at the opening peripheral edge 48a of the opening 48 leading to the protected portion 30. Similarly to the protective film 40 illustrated in FIG. 3, the protective film 140 illustrated in FIG. 4 covers the upper surface of the strain-resistance film 32 except for a portion at which the opening 48 is formed.

As illustrated in FIG. 3, the protective film 140 includes the third protective film portion 146 connecting the first protective film portion 142 and the second protective film portion 144. The third protective film portion 146 is transitionally changed in thickness from the first thickness T1 at a first connection position 146a with the first protective film portion 142 to the second thickness T2 at a second connection position 146b with the second protective film portion 144.

In the sensor member 118, the second protective film portion 144 is formed at the opening peripheral edge 48a of the opening 48 leading to the protected portion 30. The third protective film portion 146 is formed to surround an outer periphery of the second protective film portion 144, and the first protective film portion 142 is formed at a portion other than the opening peripheral edge 48a at which the second protective film portion 144 is formed and other than a portion around the opening peripheral edge 48a at which the third protective film portion 146 is formed.

Similarly to the electrode portion 50 illustrated in FIG. 3, the electrode portion 150 of the sensor member 118 includes the first electrode portion 52 disposed in the opening 48 and connected to the strain-resistance film 32 of the protected portion 30, and a second electrode portion 154 connected to the first electrode portion 52 at the outer peripheral edge of the first electrode portion 52 and formed on the second protective film portion 144. Incidentally, an outer peripheral edge of the second electrode portion 154 which is also an outer peripheral edge of the electrode portion 150 coincides with an outer peripheral edge of the second protective film portion 144.

An interface 160 between the electrode portion 150 and the protective film 140 is continuous from an inner edge 160b facing the protected portion 30 to an outer peripheral edge 160a of an upper surface of the sensor member 118. As illustrated in FIG. 4, the outer electrode surface 150a of the electrode portion 150 which is a surface not facing the protective film 140 and an outer protective film surface 140a of the protective film 140 which is a surface not facing the electrode portion 150 are connected at the outer peripheral edge 160a of the interface 160 without forming a step parallel to the interface 160 inside the outer peripheral edge 160a.

In addition, the outer protective film surface 140a of the protective film 140 is inclined in the vicinity of the outer peripheral edge 160a of the interface 160 by the third protective film portion 146. The outer electrode surface 150a of the electrode portion 150 is also inclined in the vicinity of the outer peripheral edge 160a of the interface 160. Accordingly, in the sensor member 118 as well, similarly to the sensor member 18, the outer electrode surface 150a and the outer protective film surface 140a are smoothly connected. The difference in inclination between the outer electrode surface 150a and the outer protective film surface 140a at the periphery of the interface 160 is not particularly limited, but is preferably set to, for example, 0 to 45 degrees from the viewpoint of preventing the intrusion of moisture or the like from the interface 160.

In the sensor member 118 illustrated in FIG. 4, since the thickness of the protective film 140 changes gently, the occurrence of cracks due to the concentration of stress in the protective film 140 can be more suitably prevented, and the reliability can be enhanced. In addition, regarding the points of common with the sensor member 18, the sensor member 118 has the same effects as the sensor member 18.

EXPLANATIONS OF LETTERS OR NUMERALS

10 PRESSURE SENSOR
12 CONNECTION MEMBER
12a THREAD GROOVE
12b FLOW PATH
14 PRESSING MEMBER
16 CIRCUIT SUBSTRATE
18, 118 SENSOR MEMBER
72 INTERMEDIATE WRING
20 STEM
21 FLANGE PORTION
22 MEMBRANE (METAL BASE)
22a INNER SURFACE
22b OUTER SURFACE
30 PROTECTED PORTION
32 STRAIN-RESISTANCE FILM
33 DETECTION PORTION

R1 FIRST RESISTOR
R2 SECOND RESISTOR
R3 THIRD RESISTOR
R4 FOURTH RESISTOR
34 ELECTRICAL WIRING
38 INSULATING FILM
40, 140 PROTECTIVE FILM
40a, 140a OUTER PROTECTIVE FILM SURFACE
42, 142 FIRST PROTECTIVE FILM PORTION
T1 FIRST THICKNESS
44, 144 SECOND PROTECTIVE FILM PORTION
T2 SECOND THICKNESS
44a OUTER PERIPHERAL EDGE
146 THIRD PROTECTIVE FILM PORTION
146a FIRST CONNECTION POSITION
146b SECOND CONNECTION POSITION
48 OPENING
48a OPENING PERIPHERAL EDGE
50, 150 ELECTRODE PORTION
50a, 150a OUTER ELECTRODE SURFACE
52 FIRST ELECTRODE PORTION
52a OUTER PERIPHERAL EDGE
54, 154 SECOND ELECTRODE PORTION
54a OUTER PERIPHERAL EDGE
60, 160 INTERFACE
60a, 160a OUTER PERIPHERAL EDGE
60b, 160b INNER EDGE

What is claimed is:

1. A sensor member comprising:
a protected portion provided on one surface of a metal base and including a detection portion;
a protective film including a first protective film portion having a first thickness and a second protective film portion having a second thickness thicker than the first thickness and formed at an opening peripheral edge of an opening leading to the protected portion, and covering at least a part of the protected portion from above; and
an electrode portion including a first electrode portion disposed in the opening and connected to the protected portion, and a second electrode portion connected to the first electrode portion at an outer peripheral edge of the first electrode portion and formed on the second protective film portion.

2. The sensor member according to claim 1,
wherein an outer electrode surface of the second electrode portion which does not face the protective film and an outer protective film surface of the protective film which does not face the electrode portion are connected at an outer peripheral edge of an interface between the electrode portion and the protective film without forming a step.

3. The sensor member according to claim 1, wherein an outer peripheral edge of the second electrode portion which is also an outer peripheral edge of the electrode portion coincides with an outer peripheral edge of the second protective film portion, when viewed from above.

4. The sensor member according to claim 1,
wherein the protective film is transitionally changed in thickness from the first thickness at a connection position with the first protective film portion to the second thickness at a connection position with the second protective film portion, and includes a third protective film portion connecting the first protective film portion and the second protective film portion.

5. The sensor member according to claim 1, wherein the protective film comprises at least one of an oxide, a nitride, and an oxynitride.

6. The sensor member according to claim 1,
wherein the protected portion includes an insulating film covering the one surface from above, and a strain-resistance film formed on the insulating film and constituting the detection portion.

7. The sensor member according to claim 1,
wherein the detection portion detects a pressure acting on the metal base.

8. A physical quantity sensor comprising:
the sensor member according to claim 1; and
a circuit substrate including a circuit to which a detection signal from the detection portion is transmitted.

* * * * *